Aug. 4, 1970         R. A. HOUGHTEN         3,522,433
                 SATELLITE COMMAND SYSTEM
Filed Jan. 15, 1968                    4 Sheets-Sheet 1

Richard A. Houghten,
INVENTOR.
BY
ATTORNEY

Aug. 4, 1970  R. A. HOUGHTEN  3,522,433
SATELLITE COMMAND SYSTEM
Filed Jan. 15, 1968  4 Sheets-Sheet 2

Richard A. Houghten,
INVENTOR.
BY.

ATTORNEY.

Aug. 4, 1970  R. A. HOUGHTEN  3,522,433
SATELLITE COMMAND SYSTEM
Filed Jan. 15, 1968  4 Sheets-Sheet 3
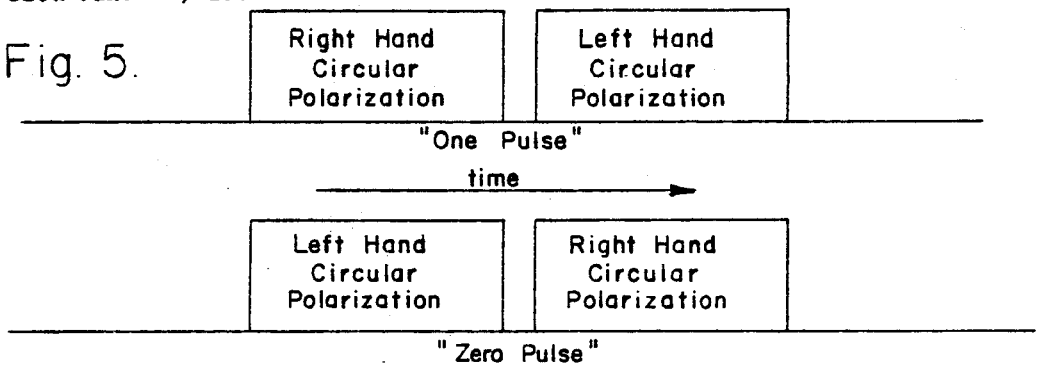
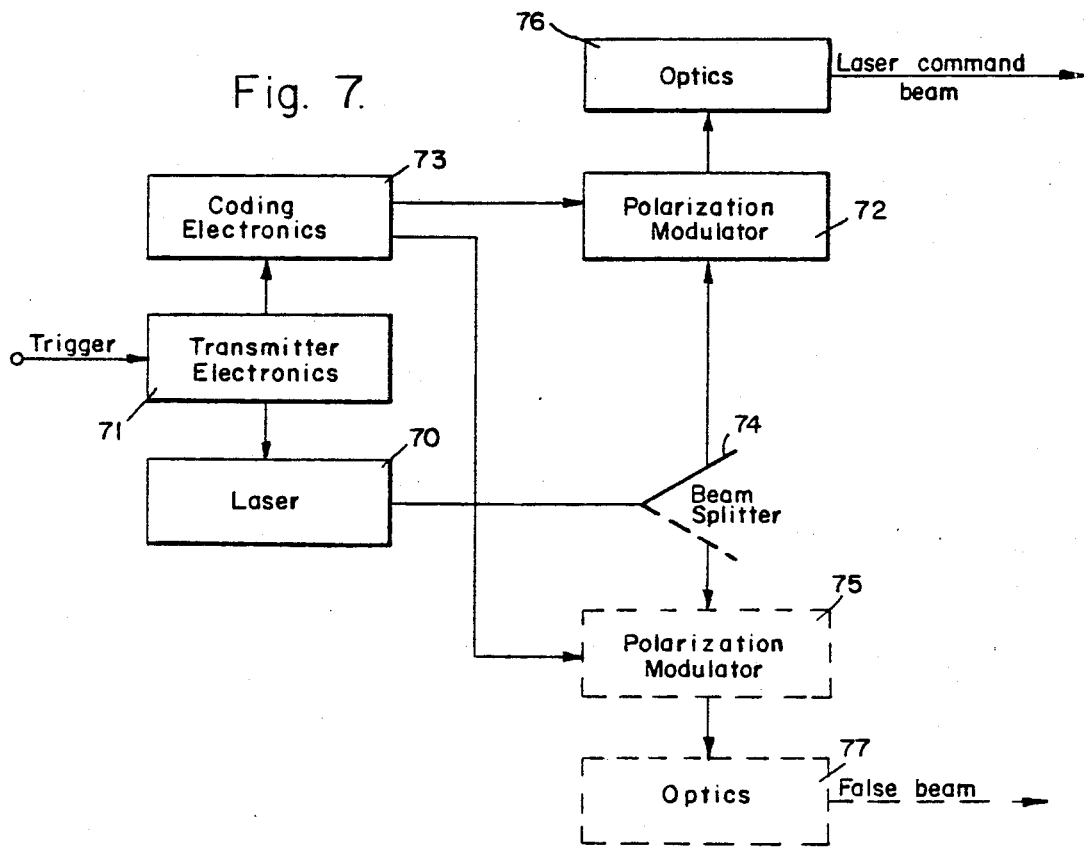
Richard A. Houghten.
INVENTOR.
BY.
ATTORNEY.

Aug. 4, 1970 R. A. HOUGHTEN 3,522,433
SATELLITE COMMAND SYSTEM
Filed Jan. 15, 1968 4 Sheets-Sheet 4

Richard A. Houghten,
INVENTOR.
BY.

ATTORNEY.

United States Patent Office 3,522,433
Patented Aug. 4, 1970

3,522,433
SATELLITE COMMAND SYSTEM
Richard A. Houghten, Fallbrook, Calif., assignor to
Hughes Aircraft Company, Culver City, Calif., a
corporation of Delaware
Filed Jan. 15, 1968, Ser. No. 697,944
Int. Cl. H04b 9/00
U.S. Cl. 250—199             6 Claims

ABSTRACT OF THE DISCLOSURE

A secure optical communications system primarily useful for the transmission of command signals to an orbiting space vehicle. The system makes use of the circular polarization modulation of a laser beam and limited access optical receivers. Security is further improved by the use of a false command beam having reciprocal polarization modulation to cancel portions of the valid command beam in the region of the command system transmitter.

FIELD OF THE INVENTION

This invention relates to secure communication systems and more specifically to methods and apparatus for secure transmission of electromagnetic waves from a ground location to a space vehicle.

DESCRIPTION OF THE PRIOR ART

In the past decade the use of space vehicles and particularly orbiting space vehicles or artificial satellites has become widespread. The future promises a phenomenal growth in the adaptation of satellites to innumerable commercial, scientific, educational and military functions. Much of the recent investigations in satellite applications surrounds the so-called "synchronous" or "stationary" satellite. These terms are generally used to describe a satellite which is in equatorial orbit with the same orbital period as the period of rotation of the planetary body and which thus appears stationary with respect to the surface of the planetary body.

The benefits of satellites in synchronous orbits are well-known; for example, satellites in synchronous orbits are capable of providing constant optical or radio coverage of a large part of the surface of the earth. In general, artificial satellites, including those in synchronous orbit, must be supplied with command information from time to time. This command information is necessary for many reasons. For example, for making minor orbital corrections; switching transmitters, receivers, transponders, antennas and redundant circuits; and otherwise controlling the satellite modes of operation. One problem which is associated with the command control of synchronous satellites, and especially those intended for military applications, is that of maintaining security. That is, military satellites in synchronous orbit, due to their fixed position relative to the surface of the earth, are especially susceptible to enemy electronic counter measures. Such counter measures can include attempts to frustrate valid command control by jamming operations or to control the satellite with false commands.

Accordingly, it is an object of the present invention to provide a satellite command communications link having a high degree of resistance to electronic counter measures.

Some unique features inherent in the synchronous orbit or stationary satellite make it possible to focus considerable attention on security measures. Thus, with a synchronous satellite it is possible to use only a single command control station, the location of which can be selected over a wide latitude. Additionally, either mobile or fixed command control stations can be utilized at locations which are most advantageous to the maintenance of security.

The advantages of an isolated command control station, however, would largely disappear if radio frequency command signals were to be utilized. That is, due to atmospheric refraction, relatively large beamwidths, and unwanted spillover from RF directional antennas, enemy detection of the command signals would be relatively simple.

It is another object of the present invention to provide a secure satellite command system utilizing an optical transmission system.

SUMMARY OF THE INVENTION

In accordance with the principles of the present invention, the private transmission of command messages from a command station to a satellite is accomplished by a laser ground-to-satellite link. By utilizing transmitting and receiving telescopes, extremely narrow beamwidths can be obtained. To further insure communications privacy, circular polarization is utilized with the modulation being in the form of pulses of alternate right-hand and left-hand polarization sense. Additional masking pulses can be transmitted, together with the valid command pulses, through a secondary transmitter telescope aligned with its axis intersecting that of the primary telescope at a very small angle.

One or more receiving telescopes in the satellite are adapted to sweep over predetermined areas of the planetary body which include the regions of possible command transmitter locations. A receiving gate activated at predetermined times during each revolution of the spinning satellite limits the "window" of reception to a preferred region of the swept area. Multiple telescopes and optical detectors and decorders permit redundant command system receiver circuitry.

These and other objects and features of the present invention will be more readily understood from the following description taken in conjunction with the accompanying drawings in which like numerals refer to like elements, and wherein:

BRIEF DESCRIPTION OF THE DRAWINGS

FIG. 5 is a graphical representation of one possible pulse modulation code useful in practicing the present invention;

FIG. 7 is a block diagram of a command system transmitter useful in practicing the present invention;

DESCRIPTION OF THE PREFERRED EMBODIMENTS

Figure 1:
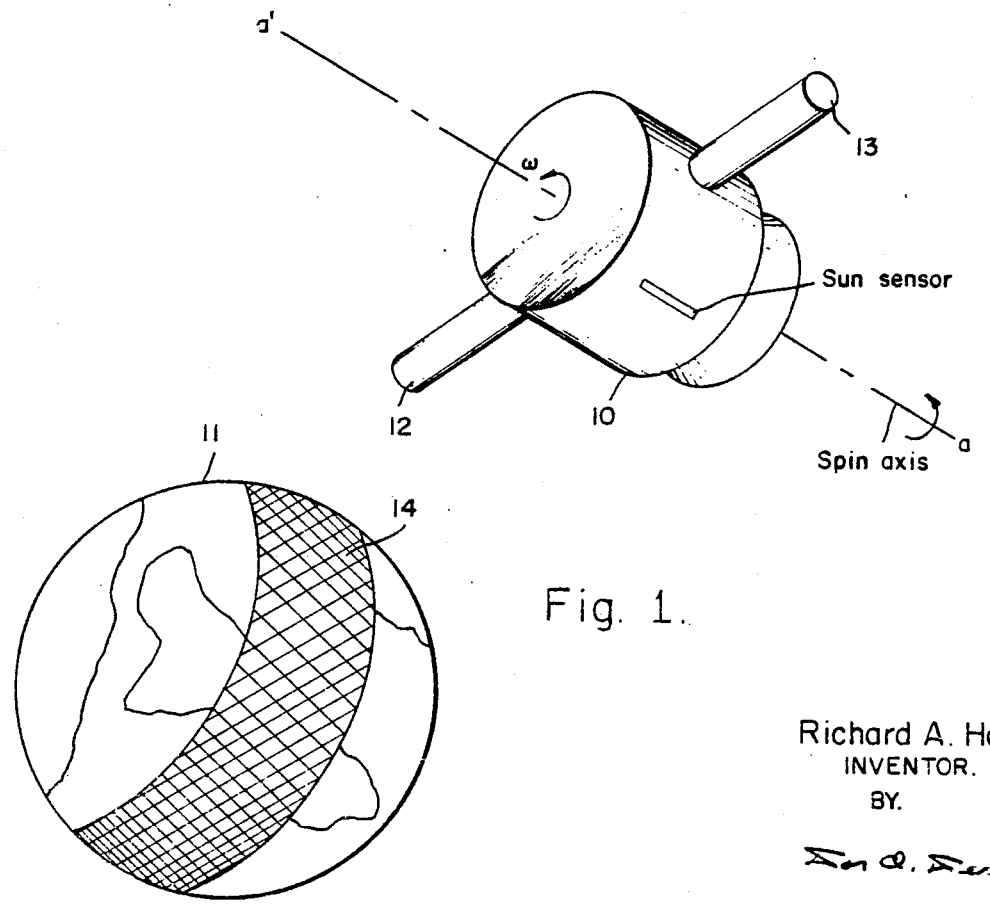
FIG. 1 is a simplified perspective view of a satellite incorporating the command system of the present invention and orbiting a planetary body.

Referring more specifically to the drawings, FIG. 1 is a perspective view of an orbiting space vehicle or satellite illustrating a preferred use of the present invention. In FIG. 1 satellite 10 is shown in orbit about a planetary body 11. The orientation of satellite 10 can be stabilized by "spinning" it about its axis $a$–$a'$ at an angular velocity $\omega$. A pair of oppositely aligned optical telescopes 12 and 13 disposed on opposite sides of satellite 10 provide optical coverage of an area of planetary body 11 shown by the cross-hatched region 14.

In a preferred use, the view of FIG. 1 represents a satellite in a so-called "stationary" or "synchronous" orbit about the earth. In equatorial orbit at the "synchronous" altitude the satellite appears stationary with respect to a point on the surface of the earth. As the satellite 10 spins about its axis $a$–$a'$, fields of view of telescopes 12 and 13 sweep over the area of earth indicated by the cross-hatched area 14. As will be explained in greater detail hereinbelow, added coverage is obtained through the use of two telescopes, each having abutting or slightly overlapping fields of view. The use of redundant satellite telescopes extends the band 14 of earth coverage. This, in turn, provides a greater certainty of command signal reception during the period immediately following satellite injection when the precise satellite spin orientation may not yet accurately established. In addition, the wider field of view allows for a greater flexibility in the selection of the ground command station locations.

Figure 2:
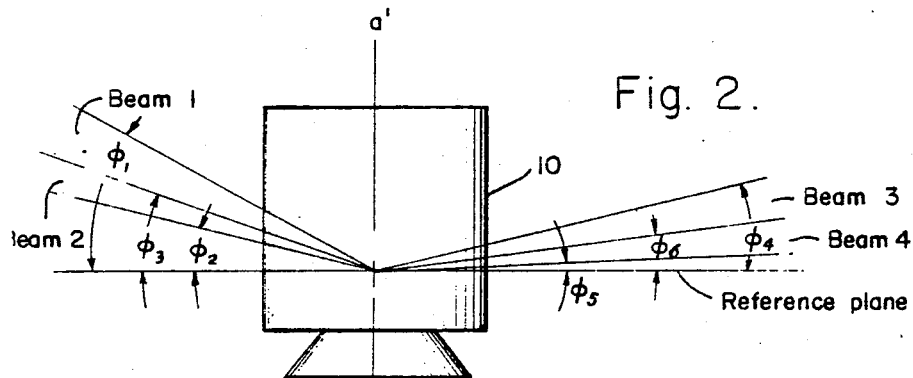
FIG. 2 is a simplified elevation view of a satellite such as that shown in FIG. 1 indicating the receiving beam positions.

In FIG. 2 there is shown a simplified elevation view of the satellite of FIG. 1 illustrating the beam positions of the receiving telescopes 12 and 13. It is convenient if a reference plane is established which is perpendicular to the spin axis $a$–$a'$ of satellite 10 in order to define the beam positions of the receiving telescopes. Beam 1 is defined to include the angle $\phi_1$–$\phi_3$ as shown in FIG. 2, and beam 2 is defined to include the angle $\phi_3$–$\phi_2$, all angles being measured from the reference plane. The combination of beams 1 and 2 comprises the field of view of one of the telescopes 12 or 13. The field of view of the other telescope comprises beams 3 and 4. Beam 3, in turn, is defined to include the angle $\phi_4$–$\phi_6$, as shown in FIG. 2, whereas beam 4 is defined to include the angle $\phi_6$–$\phi_5$. In general, $\phi_4$ and $\phi_2$ are selected so that they are substantially equal, thereby insuring that the field of view of the combined telescopes 12 and 13 includes the entire angle between $\phi_1$ and $\phi_5$ with no gaps in coverage.

In one application which has been proposed, beams 1, 2, 3, and 4 have been selected as defining equal angles of 1.5 degrees. The total field of view of the combined telescopes 12 and 13 is thus 6.0 degrees and if the angle $\phi_5$ is selected as 0.5 degree, then the field of view extends from 0.5 to 6.5 degrees with respect to the reference plane. The angles mentioned above, of course, are intended solely for the purpose of illustration and should not be deemed as limiting the scope of the present invention. It is obvious that larger or smaller fields of view may be utilized, depending upon design requirements. Furthermore, the fields of view can be selected to include the region lying in the reference plane if desired.

Figure 3:
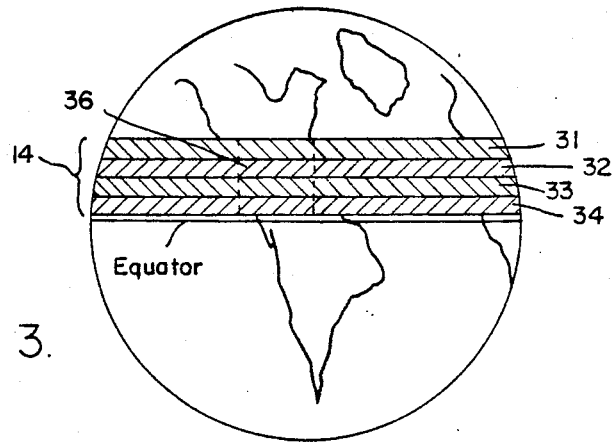
FIG. 3 is a pictorial illustration of an example of the earth coverage provided by the satellite of FIG. 2.

In a preferred use satellite 10 is oriented so that the reference plane of FIG. 2 is substantially coextensive with the equatorial plane of the planetary body about which it is orbiting. In other words, the spin axis $a$–$a'$ is preferably perpendicular to the equatorial plane. When so oriented, the area of the planetary body which is swept by the receiving beam of telescopes 12 and 13 appears somewhat as shown in the pictorial view of FIG. 3. In FIG. 3, the portions of the earth, viewed by satellite beams 1, 2, 3, and 4, are indicated by bands 31, 32, 33 and 34, respectively. Suitable command system transmitter locations can, therefore, be selected within any of these bands.

Figure 4:
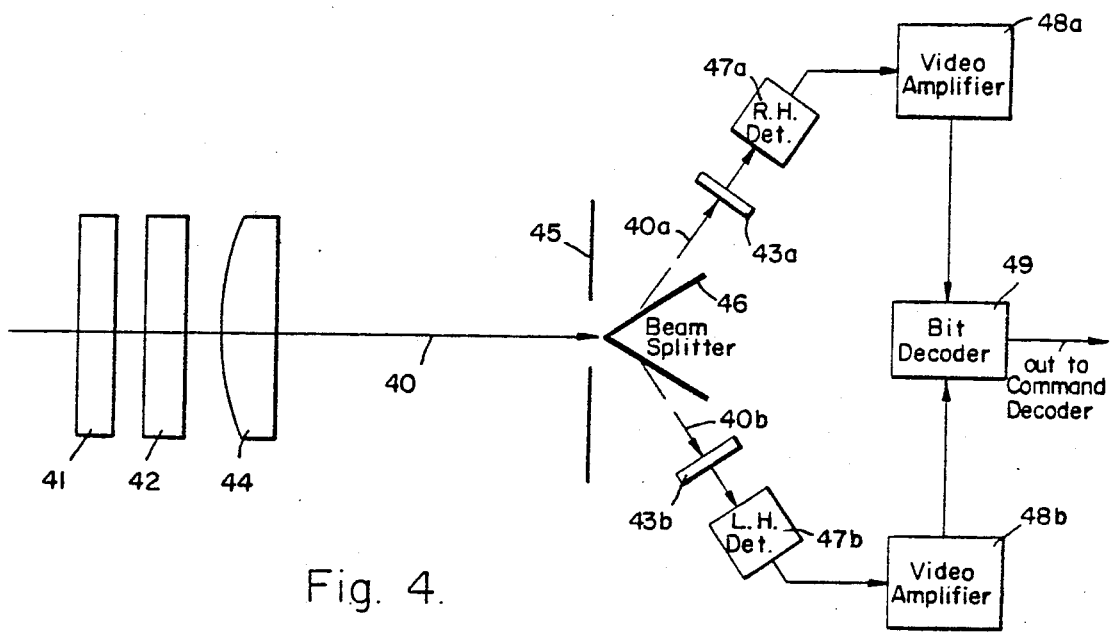
FIG. 4 is a block diagram of a portion of the satellite optical receiving apparatus in accordance with the present invention.

A block diagram of one of the receiver systems for one of the satellite beams 1, 2, 3, or 4, together with its associated detector circuitry, is shown in FIG. 4. In FIG. 4, the light enters from the left along an optical path represented by arrow 40. Coaxially disposed along the optical path are an optical bandpass filter 41, a quarter wave plate 42, an objective lens 44, a field stop 45 and a beam splitting member 46.

The beam splitter divides the light beam between paths 40a and 40b to the right-hand 47a and the left-hand 47b polarization detector systems. Polarizers 43a and 43b are disposed between the beam splitter and detectors 47a and 47b to reject light of the undesired polarization. Polarizer 43a, for example, permits the transmission of right-hand polarized light to the right-hand detector 47a for pulse detection. The detected pulse is fed to video amplifier 48a and, in turn, to bit decoder 49. Depending on the arrival sequence of right and left-hand pulses, bit decoder 49 supplies a digital "one" or a digital "zero" to command decoder (see FIG. 9).

Before describing the operation of the satellite receiver telescope and detector apparatus of FIG. 4 in greater detail, a brief mention of the modulation mode is in order. In the preferred mode of operation, polarization modulation is employed between the ground station command system transmitter and satellite command system receiver. That is, a form of pulse code modulation is utilized wherein digital "ones" and "zeros" are represented by a train of several closely spaced pulses of right-hand and left-hand circularly polarized wave energy, with the information content being determined by the position of right or left-hand polarized pulses within the train. FIG. 5 shows a typical pulse code that can be utilized. Commands to the satellite thus take the form of "words," each consisting of a predetermined sequence comprising a plurality of digital "ones" and "zeros."

One reason for utilizing circular polarization arises from the obvious fact that with circular polarization the transmitting and receiving apparatus need not be oriented to coincide with a specific polarization angle. Secondly, the circular polarization modulation of the transmitted laser beam is preferred for communication privacy reasons. That is, a "snooper" in the vicinity of the command system transmitter may be able to determine the information content of a plane polarized command signal by observing the light pulses scattered by the atmosphere. Snooping in this manner is much more difficult, however, when circular polarization modulation is employed because of the depolarizing effect of the atmospheric scattering process.

Communication privacy is important to the command system concept because it permits the command decoder to be simplified in the satellite. As in most secure command systems, the commanding is accomplished in three steps: command enable, command message insertion, and command execute. The command enable and/or the command execute are secure random code digital words of sufficient length to make the probability of enemy trial and error false commanding negligible. If the command system does not provide communication privacy, equipment must be provided in the satellite to change the secure words after use to prevent reuse by the enemy. Since the command system described herein provides communication privacy, a much simpler and more reliably fixed code secure word command decoder can be used in the satellite.

Returning to the description of the operation of the embodiment of FIG. 4, the incoming polarization modulation light pulses from the command system transmitter enter along light path 40 from the left. Only optical wave energy having wavelengths in the vicinity of the transmitted command signals are transmitted through optical bandpass filter 41. Depending upon the sharpness of the selectivity characteristic of optical filter 41, most of the "noise" from solar radiation and other sources is eliminated. The filtered command signal then passes through a quarter-wave plate 42 which serves to convert the circularly polarized light pulses to plane polarization.

The operation of the quarter-wave plate-polarizer element on circularly polarized light is well-known and is described in most treatises on optics. Briefly, however, the plane of polarization of the plane polarized light waves emerging from quarter-wave plate 42 is determined by the sense of the circularly polarized wave energy incident thereon. That is, light which is circularly polarized in a right-hand sense will emerge from the quarter-wave plate 42 plane polarized at an angle $\alpha$ with respect to an arbitrarily assigned reference plane. Light which is circularly polarized in the opposite or left-hand sense, on the other hand, emerges from quarter-wave plate 42 plane polarized at an angle $\alpha \pm 90°$.

Pulses of both left and right-hand rotational sense are then focused by means of receiving objective lens 44 through a field stop 45 and directed toward beam splitting member 46.

Since polarizers 43a and 43b only transmit light polarized in a preferred plane and reject light polarized orthogonal thereto, it is seen that by properly orienting the two polarizers right-hand polarized pulses are detected at the right-hand detector 47a and left-hand pulses are detected at the left-hand detector 47b. The output of the two detectors are then coupled through video amplifiers 48a and 48b to bit decoder 49 where they are combined to form the coded message to the satellite command decoder, not shown.

As mentioned hereinabove in connection with the diagrams of FIGS. 1 through 3, the spin-stabilized satellite is capable of receiving command signals from command stations located anywhere within the fields of view of receiver telescopes 12 or 13. These locations are indicated generally by cross-hatched band 14 in FIGS. 1 and 3. In some applications it may be desirable to limit the region of command station transmitter locations still further while at the same time retaining the advantages of the multibeam receiver telescopes.

Figure 6:
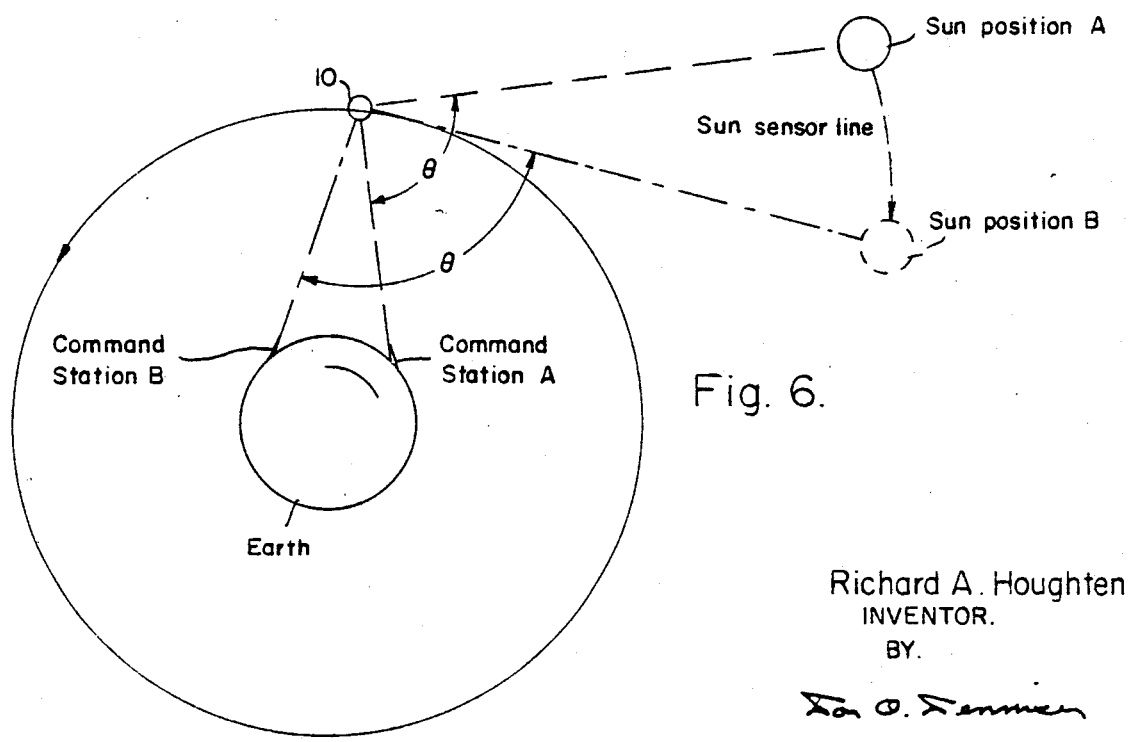
FIG. 6 is a pictorial view of a satellite in synchronous orbit illustrating the conditions for satellite command receiver gating.

A method of limiting this "command access window" to a preferred longitudinal region such as region 36 within band 14 in FIG. 3 is shown schematically in FIG. 6. In FIG. 6 satellite body 10 is shown in plane view in synchronous orbit about the earth. The sun is shown in positions A and B relative to the seemingly stationary satellite 10. It is obvious, of course, that considerable license has been taken with the relative dimensions employed in FIG. 6.

In principle, the command receivers are gated so as to be responsive to command signals only during a small portion of each revolution of the spin-stabilized satellite 10. In addition, the command access window is further restricted to brief periods during each day. Gating of the receivers is accomplished by employing one or more sun sensors mounted on or within the satellite 10. The sun sensors which can comprise, for example, photoelectric cells, are responsive to the intense solar radiation. An opaque mask having a small slit can be mounted over the photoelectric cells to limit the field of view and to define the desired angular relationship between the sun line, the satellite, and the earth.

If, for example, it is desired to receive command signals from command station A, then it is necessary that the sun be in a position relative to the station so that the angle between them and the satellite 10 is equal to fixed angle $\theta$. Thus, the period of time that the command system receiver is active at station A is limited to a relatively brief period each day when the line between the ground station A, the sun, and the satellite form the fixed angle $\theta$. The only command pulses which are received are those which are coincident with sun sensor pulses.

It is seen from FIG. 6 that due to the relative motion of the sun with respect to the earth-satellite frame of reference the command access window moves across the surface of the earth for relative sun position B. The satellite will accept command signals from command transmitter locations, such as command station location B, which lies at the fixed angle $\theta$ with respect to the satellite-sun line. For a given satellite position the local time of day at a command station for command signal acceptance depends upon the angle $\theta$ between the satellite telescope and the sun sensor line, which angle is fixed prior to launch. During the initial phases of satellite injection, the sun sensor may be deactivated and then reactivated after the desired spin orientation and satellite position are achieved.

In FIG. 7 there is shown, in block diagram form, a command transmitter for use in the laser secure command system of the present invention. The command system transmitter utilizes as its central active elements a high-power pulsed laser 70, preferably capable of operating in the Q-switched mode. Input or pumping power to laser 70 is supplied by an appropriate transmitter electronic circuit 71. This pumping energy is provided at the times during which the correct satellite telescope is aligned with the command transmitter location. Telemetry data from the satellite sun sensors can provide the data necessary to trigger the transmitter electronics at the proper times. Depending upon the angular rotational velocity in the case of a spin stabilized satellite, one or more bits of the command message can be transmitted during each satellite revolution.

The laser output beam from laser 70 is modulated by polarization modulator 72 in response to control signals from encoding electronics circuit 73. Polarization modulator 72 can comprise, for example, a KDP cell or other suitable means for circularly polarizing the output pulses of laser 70 in both the right-hand and left-hand sense.

As will be explained in greater detail hereinbelow, it may be desirable to transmit a seconcd false laser beam to further decrease the probability of unwanted command signal detection. The dashed line blocks in FIG. 7 show the added components required to generate the additional beam. The beam splitter 74 is added to divide the laser light between the command beam and the false beam. For example, if a light pulse passing through polarization modulator 72 is polarized in the right-hand sense, then the pulse passing through polarization modulator 75 at that instant is polarized in the left-hand sense, and vice versa. The light pulses thus modulated are then transmitted through appropriate optics 76 and 77, which include collimating telescopes for confining the light pulses to very narrow beams.

As mentioned above, in connection with the satellite command system receiver of FIG. 4, circular polarization modulation is advantageous due to the security offered by the depolarizing effect of the atmospheric scattering process. That is, a "snooper" in the vicinity of the command system transmitter may be able to detect the presence or absence of command signals by observing the radiation scattered through the atmosphere. The use of circular polarization, however, reduces the possibility of unwanted detection of the command signal by this method due to the relatively small amount of polarization information present in the scattered radiation. The polarization content of the scattered radiation varies considerably with atmospheric conditions but can be expected to be on the order of 25 percent or less.

Figure 8:
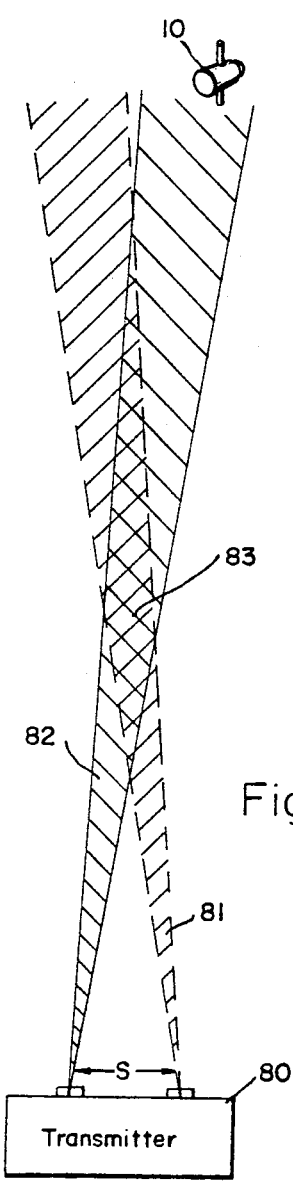
FIG. 8 is a simplified pictorial view, in exaggerated perspective, illustrating the use of a masking beam in connection with the command system ground station transmitter.

A technique for further reducing the possibility of unwanted command signal detection is illustrated in the simplified pictorial view of FIG. 8. The command system transmitter 80, described in connection with FIG. 7, makes use of the reciprocally coded false transmitter beam 81 crossing the valid command beam 82 at an acute angle. In general, this angle is just large enough so that the false beam and the valid command beam are completely separated at the range of the satellite 10. By adapting the false beam to carry the reciprocally polarized signals mentioned in connection with FIG. 7, the polarization content of the scattered radiation is largely cancelled. This, in turn, requires that a would-be "snooper" be able to distinguish between the two beams, thus effectively reducing the maximum radius about transmitter 80 at which the command signal could be detected.

At altitudes near that of the command system transmitter 80, the secure radius is largely determined by the spacing $s$ and angle between the false and valid command beam telescopes. Assuming that the angle between the two beams is just large enough so that the beams are completely separated at the altitude of satellite 10, then it is possible to calculate the cancellation of the beams.

Figure 9:
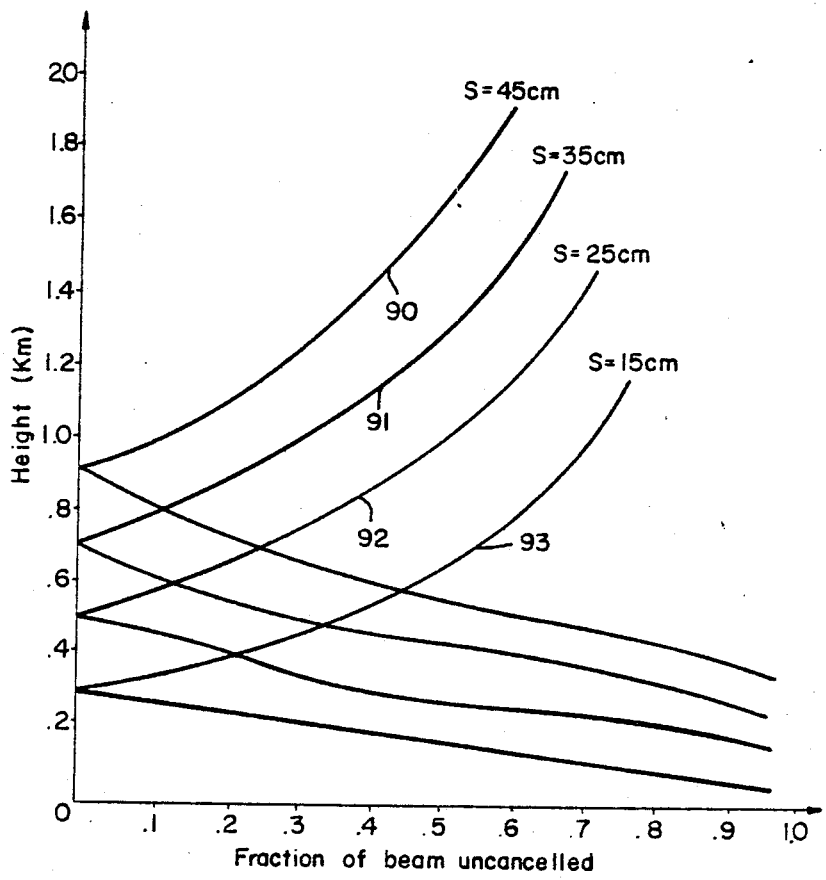
FIG. 9 is a graphical representation of the theoretical beam cancellation of the transmitter arrangement of FIG. 7 plotted as a function of altitude.

The graph of FIG. 9 illustrates the fraction of the uncancelled valid command beam plotted as a function of altitude. In the graphical representation of FIG. 9 beam diameters of 10 centimeters at the transmitter are assumed. Curves 90, 91, 92, and 93 represent telescope spacings of 45, 35, 25, and 15 centimeters, respectively.

As might be expected, complete beam cancellation occurs at lower altitudes for closer telescope spacings and higher altitudes for larger telescope spacings. The optimum beam telescope separation for a particular command system transmitter depends upon many factors. For example, the topography of the transmitter location and the location of probably "snooper" locations must be considered in making this selection.

In all cases it is understood that the above-described embodiments are merely illustrative of but a small number of the many possible embodiments which can represent applications of the present invention. Numerous and varied other arrangements can be readily devised in accordance with these principles by those skilled in the art without departing from the spirit and scope of the invention.

What is claimed is:

1. An optical communications command system comprising, in combination:
   a terrestrial command transmitter capable of generating a train of high-intensity light pulses;
   modulating means for circularly polarizing selective pulses of said train of pulses in either of two rotational senses, the information content of said pulse train being determined by the position and rotational sense of the modulated pulses within said train;
   means for confining said modulated pulse train to a narrow beam directed toward a remote command receiver, said command receiver including at least one optical telescope and at least one optical detector capable of generating an output signal in response to a light pulse impinging thereon, said telescope being aligned with said command transmitter at least during predetermined time intervals; and
   polarization sensitive means optically aligned with said telescope, said polarization sensitive means being capable of transmitting only light pulses of a preferred rotational sense to said detector.

2. The system according to claim 1 wherein said remote command receiver is located in an orbiting space vehicle.

3. The system according to claim 2 wherein said space vehicle is spin-stabilized about an axis which is substantially perpendicular to the equatorial plane of earth and wherein the field of view of said telescope sweeps over a region of earth which includes said command transmitter.

4. The system according to claim 2 wherein said space vehicle is disposed in a substantially synchronous orbit.

5. The system according to claim 3 including sun sensor means associated with said space vehicle, said sun sensor means being capable of generating output pulses during the intervals of each satellite rotational period in which said sun sensor means and the sun are aligned, and means for gating said command receiver in response to said output pulses.

6. An optical command system transmitter for communicating with a remote receiver comprising, in combination:
   means for generating a first and second train of pulses of high-intensity light;
   first modulating means for circularly polarizing selective pulses of said first train in either of two rotational senses;
   second modulating means for circularly polarizing selected pulses of said second train in a reciprocal sense with respect to said first modulating means;
   first optical means for confining said first modulated light pulses to a narrow beam directed along a first optical axis; and
   second optical means for confining said second modulated light pulses to a narrow beam directed along a second optical axis, said second optical axis intersecting said first optical axis at an acute angle.

References Cited
UNITED STATES PATENTS 3,123,714   3/1964   Chope _____ 250—199
3,251,997   5/1966   Bell et al. _____ 250—199

RODNEY D. BENNETT, Primary Examiner

M. F. HUBLER, Assistant Examiner